P. D. SMITH.
VARIABLE SPEED GEARING.
APPLICATION FILED MAR. 7, 1914.
1,134,769.
Patented Apr. 6, 1915.
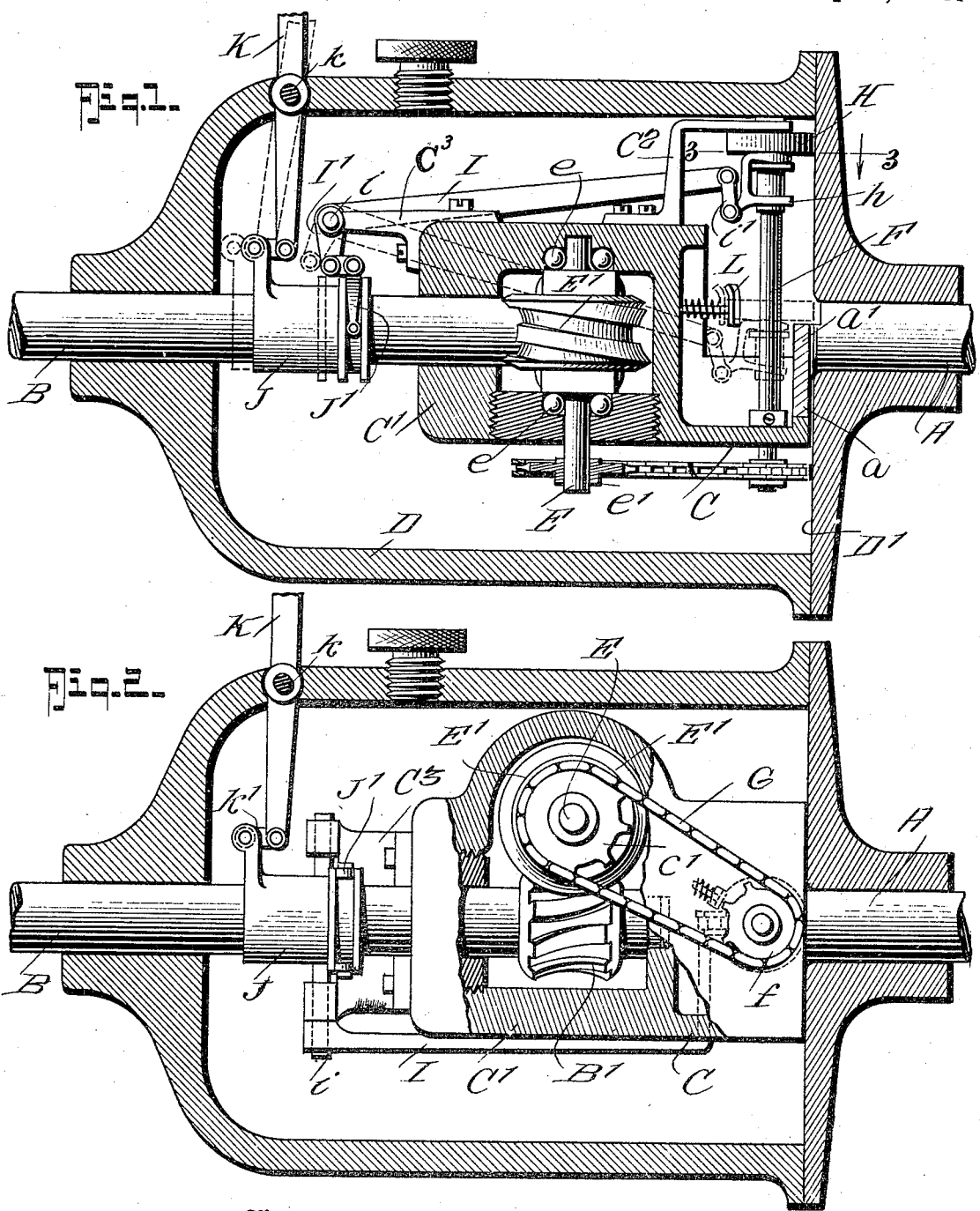
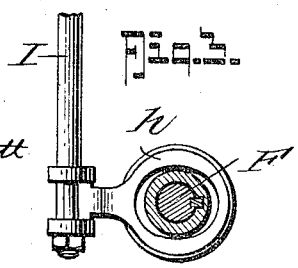
WITNESSES:
John J. Schrott
Myron G. Clear
INVENTOR
Putnam D. Smith
BY Munn & Co.
ATTORNEYS

UNITED STATES PATENT OFFICE.

PUTNAM DAVID SMITH, OF FELTON, CALIFORNIA, ASSIGNOR TO FRANCIS G. WILSON, OF SANTA CRUZ, CALIFORNIA.

VARIABLE-SPEED GEARING.

1,134,769.  Specification of Letters Patent.  Patented Apr. 6, 1915.

Application filed March 7, 1914. Serial No. 823,222.

*To all whom it may concern:*

Be it known that I, PUTNAM D. SMITH, a citizen of the United States, and a resident of Felton, in the county of Santa Cruz and State of California, have invented an Improvement in Variable-Speed Gearing, of which the following is a specification.

My present invention relates to transmission gearing and more particularly to a variable speed gearing adapted for automobiles and other machinery, and the object of my invention is to provide simple and durable means whereby rotation may be transmitted from a driving to a driven member at a variety of speeds ranging in the driven member from a revolution for every revolution of the driving member down to a stand still when the driving member is at full speed.

Other and further objects of my invention, residing for the most part in the features of construction, arrangement and operation thereof, will be apparent from the following description in which reference is made to the accompanying drawing, forming a part of this specification and in which, Figure 1 is a vertical longitudinal section through the parts connecting the driving and driven members and constituting my invention. Fig. 2 is a similar view partly in elevation, with the movable parts turned to an angle of 90° with respect to their positions in Fig. 1, and Fig. 3 is a detail inverted section taken through certain of the parts substantially on line 3—3 of Fig. 1.

Referring now to these figures, the driving and driven members A and B respectively, in the form of axially alined shafts, are preferably spaced apart at their contiguous ends and connected by an inner frame C and an outer casing D which surrounds the frame C, the said shafts being journaled through the ends of the casing D and the inner extremity of the driven shaft B being journaled in a boxed portion C' at one end of the frame C, the opposite end of which frame is rigidly connected to a disk $a$ upon the inner end of the driving shaft A.

As best shown in Fig. 2, the inner end of the driven shaft B is provided with a worm wheel B' secured thereon and located within the box-like portion C' of frame C, and which worm wheel is engaged by a worm E' secured upon a shaft E mounted transversely through the box-like frame portion and journaled in bearings $e$. The worm E' and worm wheel B' thus form an interlocking gearing between the driving and driven members, in view of the fact that the former is mounted upon a shaft extended at right angles to the axis of the driven shaft B and in the inner frame which is rigidly connected to the driving member. Therefore in order to transmit differential motion to the driven member B it is simply necessary to rotate the worm E' in order to retard the motion of the driven member, and to regulate the speed of rotation of the worm in order to properly control the speed of movement of the driven member. These functions I perform by mounting a shaft F through a portion of the inner frame adjacent to the driving member A and a bracket C² secured to said inner frame, the shaft extending in the same plane with the axis of the said driving shaft at a point slightly spaced from its inner end and transversely with respect thereto, one end of said shaft having a sprocket wheel $f$, connected by a sprocket chain G to a sprocket wheel $e'$ secured upon the respective end of a worm shaft E.

On the shaft F before mentioned is splined a friction wheel H adapted to frictionally engage and have movement radially across, a friction surface D' formed upon the inner face of that end of the casing D nearest the driving member A. The friction wheel H is adjusted on shaft F and across its friction surface by means of a bell-crank lever pivotally mounted at $i$ to a bracket C³ secured upon the inner frame C, this bell-crank lever having one long arm I connected, by means of a link $i'$, to a yoke $h$ engaging the friction wheel, and having a relatively short arm I' similarly connected by a link, to a yoke J' engaging a sleeve J loosely mounted inadjustably on the driven shaft B and under control of a lever K, the intermediate pivot $k$ of which is located in the upper portion of the wall of the casing D, and the lower inner end of which is connected by a link $k'$ to the said sleeve J.

It will be noted that it is necessary for the friction wheel H to be entirely out of engagement with the friction surface D' in order that a direct drive between the driving and driven members as before mentioned may result, and in order to permit this I preferably cut away the inner end of the driving shaft A and its disk $a$ at one side of its axis and as indicated at *a'* in Fig. 1 to provide for an extreme inner position of the friction member as shown in dotted lines, and in which position it may be engaged by a spring controlled brake member L in order to prevent accidental transmission of rotation to the worm E.

It will be seen by a comparison of the dotted and full lines in Fig. 1, that the friction member H is movable across the friction surface from an extreme outer position adjacent to the bracket C², to the extreme inner position above mentioned, and I preferably proportion the parts in such manner that the range in varied speeds will extend from that wherein the driven member is rotated a full revolution for every revolution of the driving member, to one in which the driven member will be stationary when the driving member is rotated at full speed.

During the operation the friction member H is rotated with its shaft F, and transmits such rotation, by means of chain G, to shaft E and from thence to the driven shaft B through the worm E' and worm wheel B', except when the said member H is at its inner position as shown in dotted lines in Fig. 1, and in this latter position the driving and driven shafts move as one as before stated.

Thus as applied to automobile motors, my invention is practicularly desirable in that the usual clutches may be done away with. It is also to be seen that my invention permits of an arrangement in which the operating members may be effectively inclosed and caused to move in oil, having particular reference to the boxed portion C' of the frame C, which incloses the worm E' and worm wheel B'. And furthermore it is obvious that my invention provides a construction which is highly effective, which is comparatively simple in its structure, and which will be durable in use.

I claim:

1. In a transmission gearing, the combination of axially alined driving and driven shafts having their contiguous ends spaced apart, a casing through the ends of which the said spaced ends of the driving and driven shafts are journaled, said casing having the inner face of its end adjacent the driving member formed to provide a friction surface, a frame extending between the spaced ends of the shafts within the casing and rigidly connected to the driving shaft, a worm wheel secured upon the driven shaft, a shaft mounted in the frame adjacent and at right angles to the driven shaft, a worm mounted upon the latter shaft and in engagement with the worm wheel, a shaft journaled in the said frame transversely with respect to the inner end of the driving shaft and in the axial plane thereof, gearing connecting the last mentioned shaft with the said worm shaft, a friction wheel splined on the last mentioned shaft and movable over the friction surface, and means for adjusting the friction wheel on its shaft, including an adjusting sleeve movable on the driven shaft, a lever intermediately pivoted in the wall of the casing and having its inner end connected to the sleeve, and a bell-crank lever having a yoke connection at one end with the adjusting sleeve and having a similar connection at its opposite end with the friction wheel.

2. In a transmission gearing, the combination of axially alined driving and driven shafts having their contiguous ends spaced apart, a casing through the ends of which the said spaced ends of the driving and driven shafts are journaled, said casing having the inner face of its end adjacent the driving member formed to provide a friction surface, a frame extending between the spaced ends of the shafts within the casing and rigidly connected to the driving shaft, a worm wheel secured upon the driven shaft, a shaft mounted in the frame adjacent and at right angles to the driven shaft, a worm mounted upon the latter shaft and in engagement with the worm wheel, a shaft journaled in the said frame transversely with respect to the inner end of the driving shaft and in the axial plane thereof, gearing connecting the last mentioned shaft with the said worm shaft, a friction wheel splined on the last mentioned shaft and movable over the friction surface, and means for adjusting the friction wheel on its shaft.

3. In a transmission gearing, the combination of axially alined driving and driven members having their adjacent ends spaced apart, a casing into which the inner ends of the said members extend, a frame within the casing rigidly connected to the driving member and into which the driven member is loosely extended, a friction surface formed upon the inner face of one end of the casing surrounding the driving member, a friction wheel adjustable across the said friction surface, a shaft upon which the friction wheel is splined, a worm shaft mounted in the frame adjacent and at right angles to the driven member, a worm wheel mounted on the driven member, a worm carried by the worm shaft and in engagement with the worm wheel, gearing connecting the friction wheel shaft and the worm shaft, and means for adjusting the friction wheel, all for the purpose described.

4. In a transmission gearing, the combination of driving and driven members, a frame secured to the driving member and in a portion of which the driven member is journaled, a pair of shafts mounted in the frame and connected to simultaneously rotate, interlocking gears connecting one of the said shafts with the driven member, a friction wheel splined on the other of said shafts, means for adjusting the friction wheel and a casing surrounding the said frame and through which the driving and driven members are journaled, having a flat friction surface with which the friction wheel coacts, all for the purpose described.

5. In a transmission gearing, the combination of axially alined driving and driven shafts, a frame rigidly connected to the driving member, a stationary friction surface, interlocking gears connecting the frame and driven member, an adjustable friction member engaging the friction surface and having connection with one of the said interlocking gears and means for adjusting the friction wheel, for the purpose described.

6. In a transmission gearing, the combination of axially alined driving and driven shafts, interlocking gears forming a direct connection between the said shafts, a stationary friction surface, an adjustable friction member coöperating with the friction surface and actuated by the driving member for transmitting motion to one of the said interlocking gears, and means for adjusting the said friction member, all for the purpose described.

PUTNAM DAVID SMITH.

Witnesses:
JOHN A. WILLIAMS,
C. E. LILLY.